Figure 7:
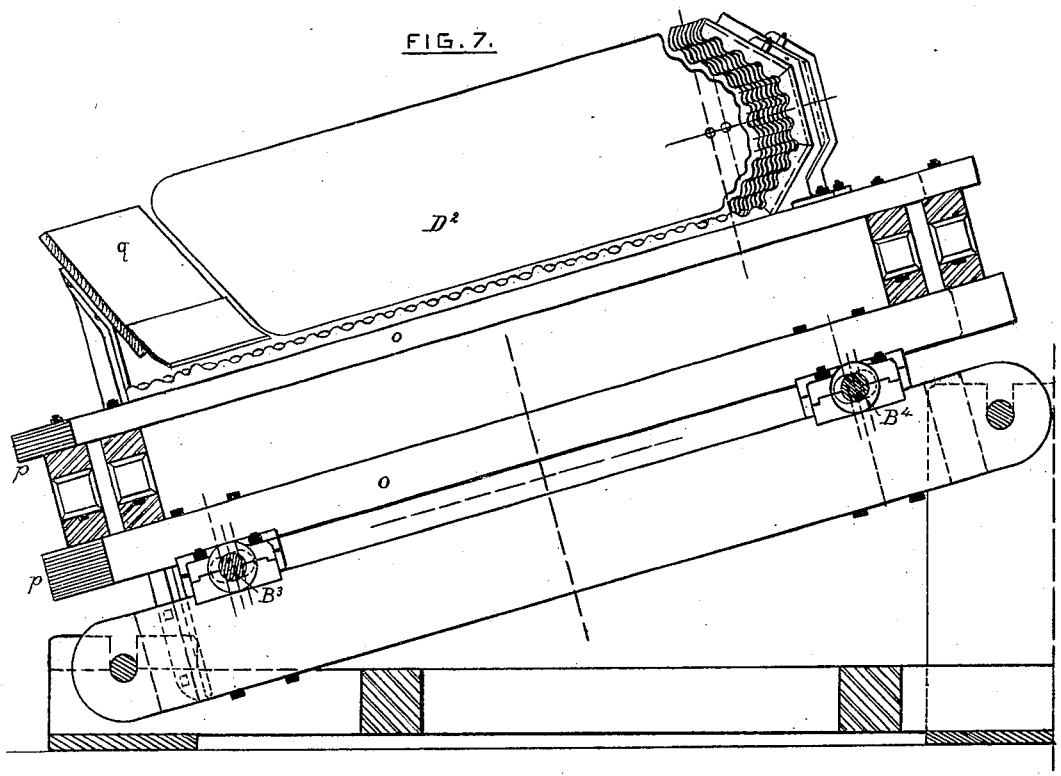

(Model.)
5 Sheets—Sheet 1.
R. EICKEMEYER.
FULLING MILL.
No. 245,362.
Patented Aug. 9, 1881.
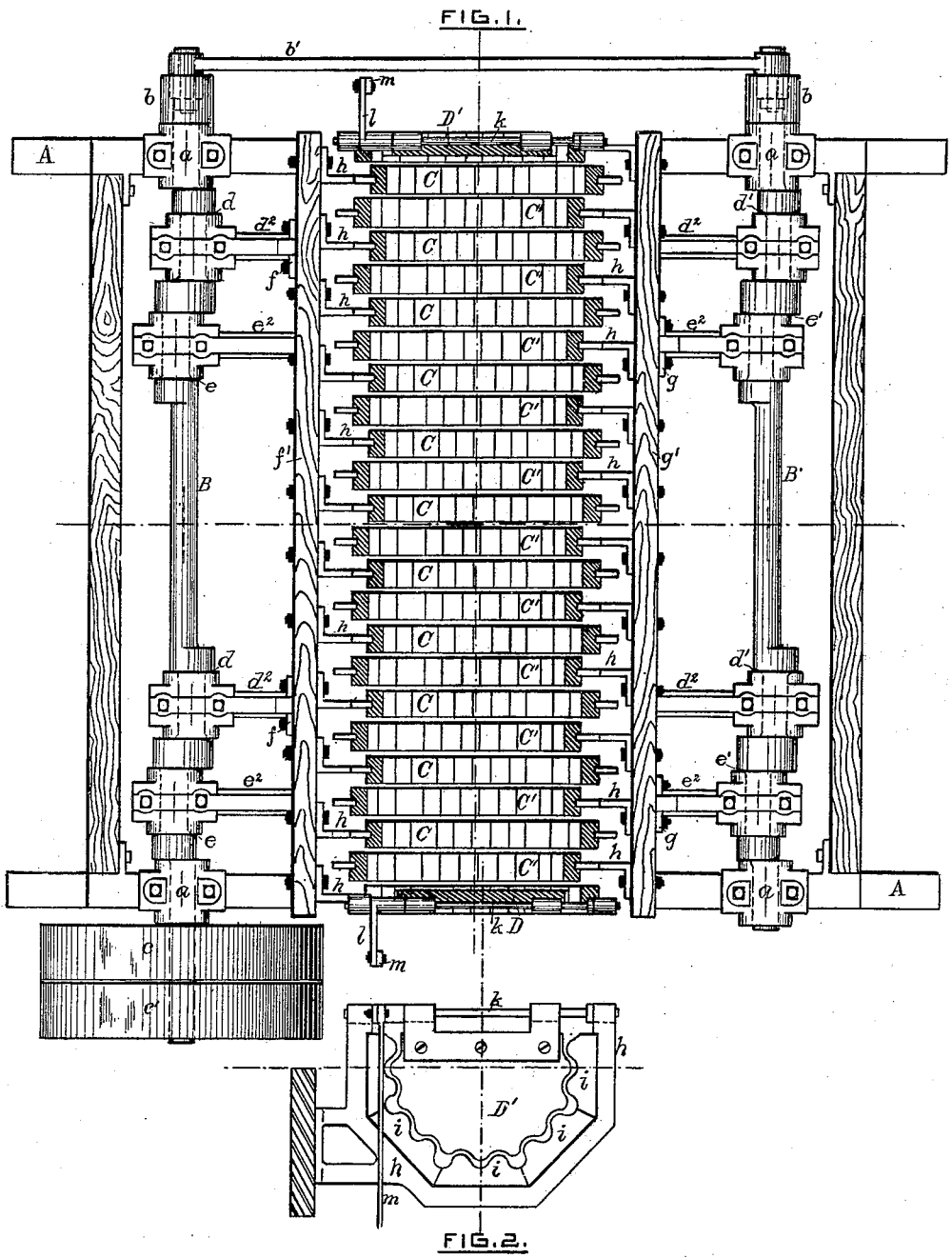
WITNESSES:
Philip F. Larner
Howell Bartle
INVENTOR:
Rudolf Eickemeyer
By M. C. Wood
Attorney

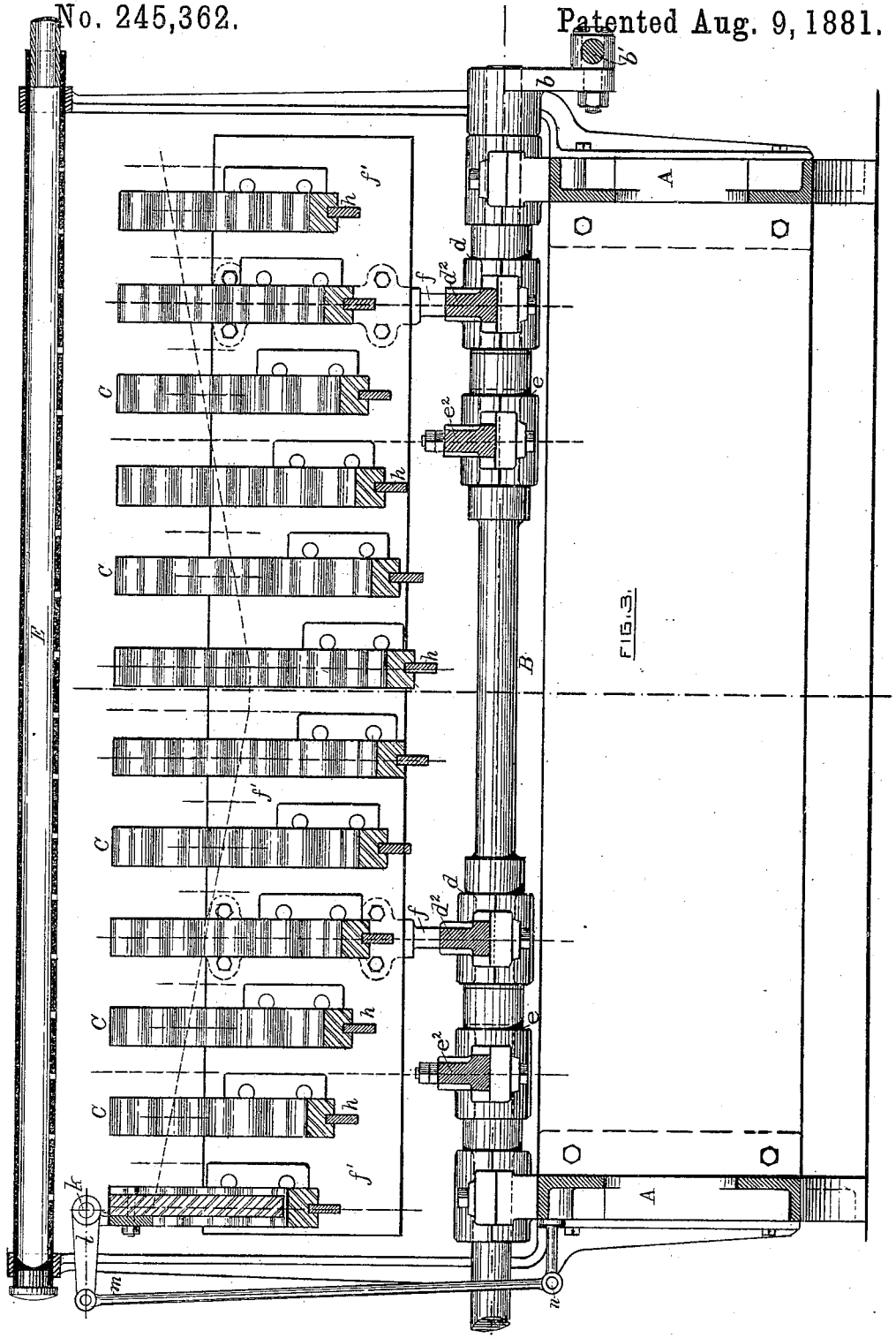

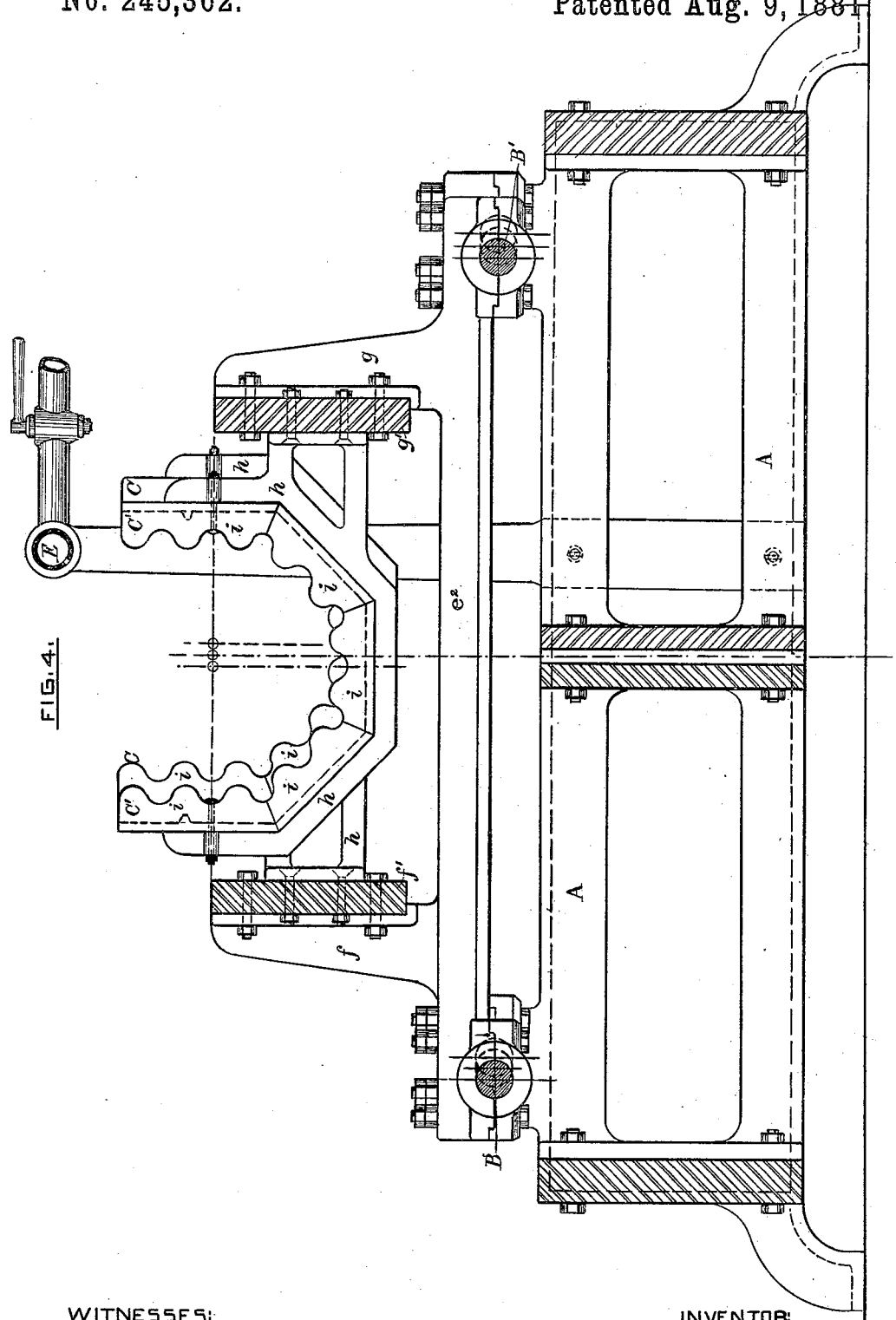

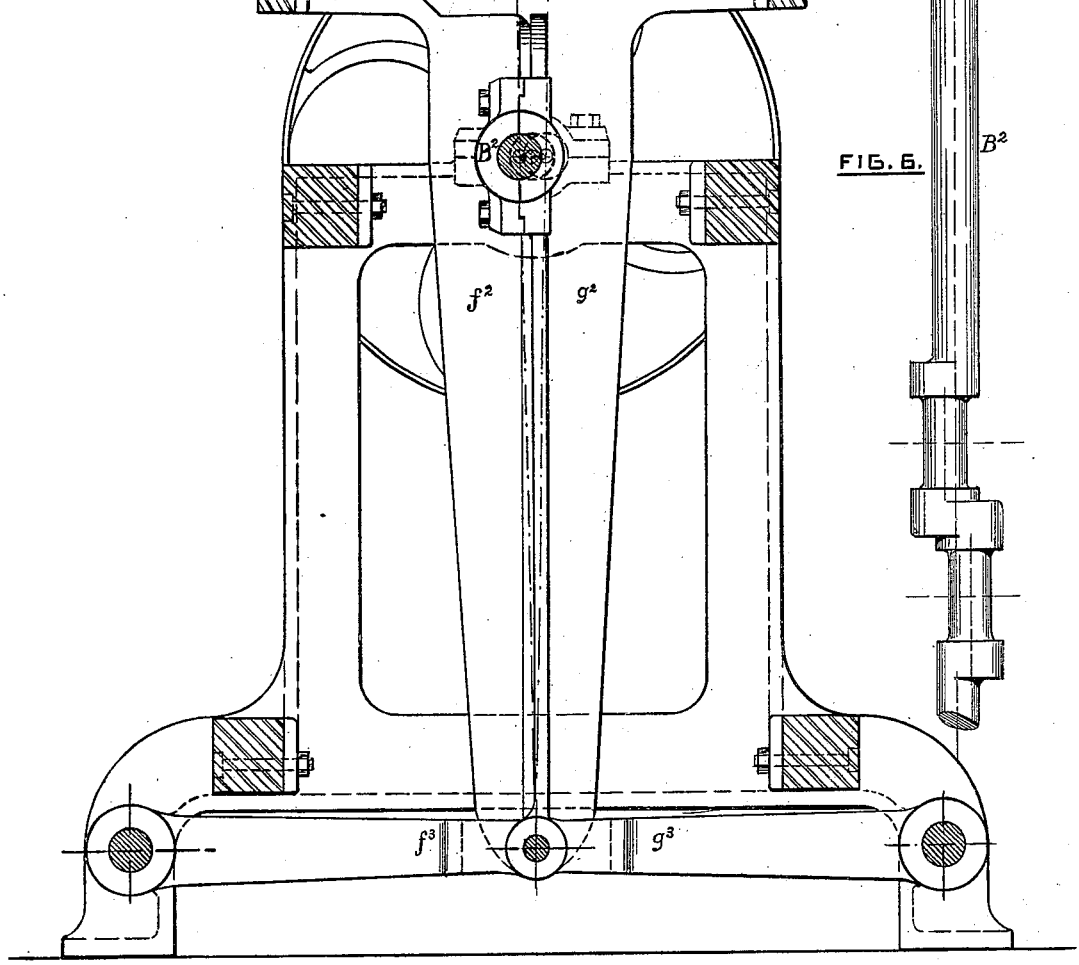

(Model.)

R. EICKEMEYER.
FULLING MILL.

No. 245,362. Patented Aug. 9, 1881.

WITNESSES:
Philip F. Larner
Howell Bartle

INVENTOR:
Rudolf Eickemeyer
By his Attorney

UNITED STATES PATENT OFFICE.

RUDOLF EICKEMEYER, OF YONKERS, NEW YORK.

FULLING-MILL.

SPECIFICATION forming part of Letters Patent No. 245,362, dated August 9, 1881.

Application filed June 4, 1881. (Model.)

*To all whom it may concern:*

Be it known that I, RUDOLF EICKEMEYER, of Yonkers, in the county of Westchester and State of New York, have invented a certain new and useful Fulling-Mill; and I do hereby declare that the following specification, taken in connection with the drawings furnished and forming a part of the same, is a clear, true, and complete description of the several features of my invention.

A fulling apparatus embodying my invention operates, in part, on what may be termed the "beater" principle, as distinguished from that class of machines which embody rollers between which the goods to be felted are compressed and rolled, as well as from that class which embodies cylindrical revolving receptacles within which the goods are placed and tumbled. My novel mill also operates, in part, on the roller or cylindrical principle to the extent that, although the beating principle is employed therein, the surface or bed on which the goods are supported is continuously in motion, as distinguished from the stationary supporting or fulling beds of beater-mills as usually constructed, and differing from such prior beater-mills as have a series of rollers in the fulling-bed, in that my mill contains no rollers.

Although advantageously applicable to other uses, my mills have been devised by me with special reference to fulling, felting, or "sizing" fur hat-bodies and such other soft and delicate goods as cannot be safely submitted to fulling-mills as ordinarily constructed. Much attention has heretofore been given to this subject, and various improvements have heretofore been made by myself and others with a view to substituting machinery for hand-labor in the preliminary stages of felting fur hat-bodies.
So far as my knowledge extends, however, there exists in the operation of all fulling or sizing machines as heretofore constructed such a tendency to abrasive action as to render it practically essential that fur hat-bodies be "started" or partially felted or hardened by hand before they can be safely committed to said machines.

All mills as heretofore constructed to operate on the beater principle have necessarily involved abrasive action, both as between the beaters and the hat-bodies and as between the hat-bodies and the contact or supporting surfaces of the fulling-bed.

In prior machines operating on the roller principle a straining action occurs as between the rollers and the mass of hat-bodies, notwithstanding the presence of the usual cloth which incloses them.

In that special class of machines which embodies revolving cylinders for containing the hat-bodies the latter, in tumbling, are exposed to abrasion by the slipping contact therewith of the moving supporting-surfaces of the cylinder, and also because the hat-bodies, tumbling in one direction, strike upon a surface which is more or less rapidly moving in the opposite direction, and in such machines there is no beating action by the surfaces on which the contents are supported, said contents being merely rolled and tumbled by the movement of said surfaces, either by their continuous rotation or by rocking to and fro—as, for instance, on an axis to which the concave supporting-surface is concentric.

In my novel mill hat-bodies are compressed by the weight of other overlying bodies in the same mass, and the beaters operate with an abutting force proportioned to the weight of the bodies or mass of bodies, because, for the first time, I have so organized beaters that the hat-bodies rest thereon, thereby rendering said beaters practically incapable of undue strain and abrasion, and in effecting the tumbling movement of the mass of hat-bodies said beaters move, while in contact therewith, in a direction corresponding to the direction traveled by those hat-bodies which for the time being support the remainder of the mass or charge of bodies contained in the mill.

Broadly stated, the main and characteristic feature in a mill embodying my invention is a fulling-bed which not only contains and supports the goods to be felted or fulled, but also operates as a vibrating beater and causes its contents to be properly turned and tumbled. Without departure from my invention such a bed may be largely varied in construction, and the same is true of the mechanism by which it may be operated.

The several features of my invention, after being fully described in detail, will be specified in the several claims hereunto annexed.

Figure 8:
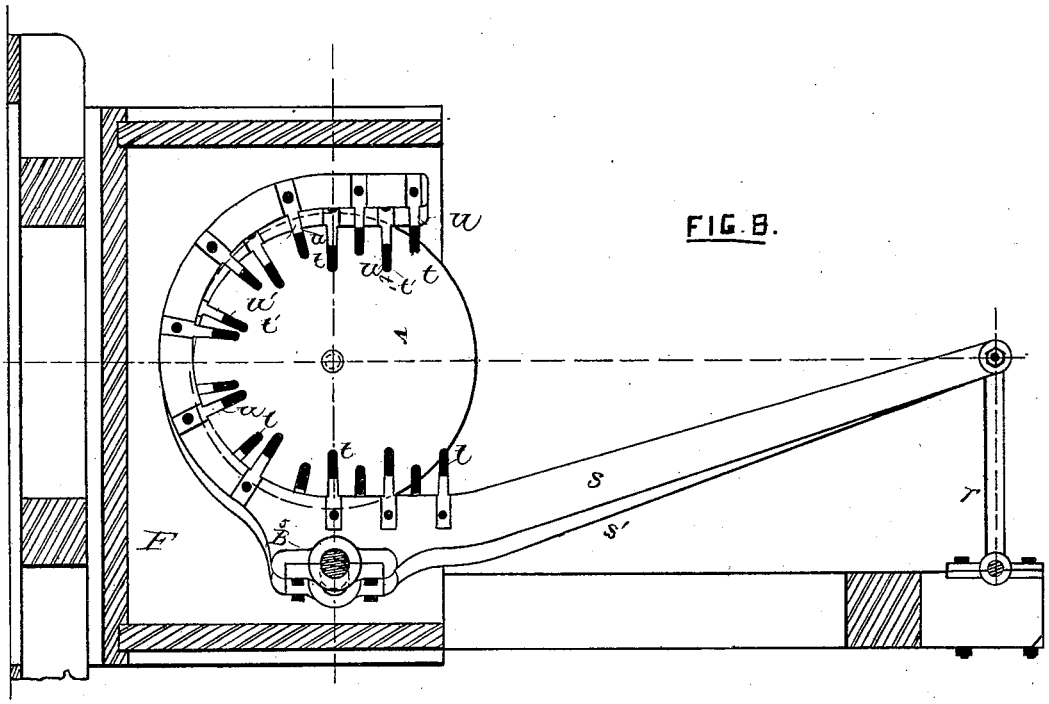

Referring to the five sheets of drawings, Figure 1, Sheet 1, is a top view of one form of mill embodying my invention. Fig. 2, Sheet 1, is an end view of the fulling-bed and an auxiliary beater. Fig. 3, Sheet 2, is a central longitudinal vertical section of the machine with one set of main beaters and one auxiliary beater detached. Fig. 4, Sheet 3, is a central transverse section of the machine without an auxiliary beater. Fig. 5, Sheet 4, is a vertical lateral central section of a machine embodying the main feature of my invention, but differing in its construction from the machine before shown. Fig. 6, Sheet 4, is a side view of the driving-shaft of machine, Fig. 5, detached. Fig. 7, Sheet 5, represents another modification of my mill partially in side view and partially in longitudinal vertical section. Fig. 8, Sheet 5, is a central vertical transverse sectional view of another form of mill embodying my invention.

The mill shown on Sheets 1 to 3, inclusive, has a skeletonized frame, A, sufficiently heavy to serve as a good foundation and to afford proper bearings for the main beater-shafts, of which there are two, B and B', mounted in four boxes, $a$, on the frame. The two shafts are rotatively coupled by cranks $b$ at each end and a link, $b'$, and the shaft B is provided with a fast and loose pulley, $c$ $c'$. Each of said shafts has four beater-cranks, which are arranged in pairs near the end of each shaft, and in each pair they are set at right angles to each other. The cranks $d$ on one shaft are connected with the correspondingly-set cranks $d'$ of the opposite shaft by bars $d^2$, and the cranks $e$ are similarly connected with cranks $e'$ by bars $e^2$. Upon each of the bars $d^2$ there is a vertical post or standard, $f$, and upon the bars $e^2$, near the opposite side of the machine, there is on each a similar vertical post, $g$. In this mill there are two co-operative series of main beaters, C and C', which constitute the fulling-bed, and auxiliary beaters D and D', one at each end. Each of the main beaters is composed, in part, of an iron frame, $h$, as shown clearly in Fig. 2, serving as a bracket for the secure reception of the beater-shoes $i$, made up in sections composed of wood or other suitable material, and laterally deeply corrugated to afford numerous beating-faces for abutting contact with the hat-bodies and to prevent the latter from slipping thereon. These beaters are placed side by side, and because of their general outline of face they form, as a whole, a fulling-bed for the reception of the hat-bodies, and because of the varying depth of the beaters said bed is deeper in the middle than at either end, as clearly indicated in Fig. 3.

The beaters C (constituting one series) are firmly secured by their brackets to a back board, $f'$, which is, in turn, rigidly secured to the inner faces of the vertical posts $f$ on the crank-bars $d^2$, and the beaters C' (of the other series) are in like manner secured to the back board $g'$ and then to the vertical posts $g$ upon the crank-bars $e^2$, and the beaters of each series respectively alternate with each other in position, the beaters of either series being separated by spaces equal in width to the width of the beaters of the other series.

With the description thus far given it will be readily seen that as the crank-shafts are rotated each series of beaters will be lifted and moved forward, while the other series is lowered and moved rearward, and so on with each rotation, resulting in an upwardly and inwardly beating action against the contents of the bed.

I prefer that the cranks on the outside of the frame, connected by the link $b'$, have a longer throw than the beater-cranks, and that they be set at right angles thereto.

The auxiliary beaters D and D' are respectively located at opposite ends of the fulling-bed, and are connected with the main beaters as follows:

The brackets $h$ of the beaters in each series located at the ends of the machine have at their upper ends bearings for the horizontal rock-shafts $k$, from which the auxiliary beaters are rigidly suspended, as clearly shown in Figs. 1 and 2, so that as the main beaters vibrate the auxiliary beaters move edgewise with the series of main beaters to which they are thus respectively connected, but their beating movements flatwise toward and from the hat-bodies in the bed are attained by me in this instance by means of an arm, $l$, which projects outwardly and at right angles from the rock-shaft $k$, as seen in Figs. 1, 2, and 3, and a link, $m$, loosely connected at its top to the outer end of said arm $l$, and its bottom to an eyebolt, $n$, in the frame of the machine. The edgewise vibratory movement of the main beaters results in a lengthening and shortening of the distances between the arm $l$ and the eyebolt $n$, and therefore the beaters D and D' are vibrated flatwise by the link $m$ in perfect harmony with the movements of the main beaters.

The edges of the auxiliary beaters are corrugated laterally to correspond generally with the corrugations of the adjacent main beaters, and they practically serve also as ends to the fulling-bed, as indicated in Figs. 1 and 2.

For supplying hot water to the hat-bodies in the fulling-bed there is located above and at one side a pipe, E, extending from end to end of the machine, provided with a suitable cock and supported in standards. This pipe is perforated at its front lower side, so as throw the water in numerous inclined jets downward upon the hat-bodies, either continuously or intermittingly, as may be desired, and in varying quantity, according to circumstances.

So far as my knowledge extends, I am the first to provide for the application of heated water in jets to the contents of a fulling or felting mill, and such an arrangement is of great value in machines for felting hat-bodies.

The fulling-bed, by reason of the inclination of its bottom from its center upward to each end, serves to more fully effect changes of position of the hat-bodies with relation to each other than would be the case if said surfaces were not thus inclined in two directions. The bottom and sides of this bed, which cause the hat-bodies to turn or tumble in mass, correspond to the front end of the fulling-bed of a common beater-mill, because the goods are caused to turn or tumble by the contact therewith of said front end, and the feature of inclination or curves in two directions in my novel fulling-bed is similar to that which constitutes, in part, the subject of my Letters Patent February 22, 1876, No. 173,922, reissued April 13, 1880, No. 9,146.

The embodiment of the upward curve at the sides in a vibrating bed, as herein shown, is a novel and valuable feature, and the same is true of the longitudinal inclination downward to the center of the bed, making it deeper in the center than at either end, for if the sides and bottom of the bed were rectangular and it were straight from end to end, the hat-bodies would fail to be properly turned or tumbled in mass, and would also fail to be properly separated from each other during their tumbling movements, and therefore said curves and inclines in my present machine enable the bed itself to more properly operate as a beater, instead of relying upon the blows of a beater co-operating therewith, as with the stationary bed shown in my said prior Letters Patent. The opposite sides of the beaters in this machine being curved alike, it is immaterial in which direction the crank-shafts are rotated, because the mass of hat-bodies will be rotated equally well, and always in a direction opposite to the direction in which said crank-shafts are rotated.

The hat-bodies are placed loosely in the fulling-bed, (or loosely enveloped in a cloth, if desired,) the mill put in motion, and hot water freely delivered upon the hats. The series of beaters alternate with each other in striking against the mass from below and on opposite sides and cause them to roll or tumble around the longitudinal axis of the bed, and the inclinations or curves of the bed also cause the hat-bodies to readily change position with relation to each other, and when hat-bodies occupy positions adjacent to the ends of the bed the auxiliary beaters operate thereon.

It will be seen that the alternate rise, advance, retirement, and fall of the two series of beaters cause their movements while in contact with the hat-bodies to correspond with the rolling or tumbling movement of the hat-bodies, and that no appreciable straining or abrasive action is possible, because one series in rising strikes the mass of hats, carries them forward, and deposits them upon the rising beaters of the other series, and so on.

I prefer the form of mill thus far described for use in large factories, because it may be smoothly operated and constructed with a large-sized bed capable of receiving, say, upward of three dozen hat-bodies; but for operating on a lesser number, machines modified in construction, as hereinafter described, may be profitably employed.

In Fig. 5 I show a machine of lesser capacity embodying a bed composed of beaters of the same character as those already described; but instead of operating them with two crank-shafts, but one is employed. The beaters C and C' are arranged in series, as before described, and connected to their respective back boards, $f'$ and $g'$; but in this machine each back board is rigidly connected at its ends with a pair of vertical legs, which are provided with boxes for receiving the wrist-pins of the single crank-shaft $B^2$, Fig. 6. The legs $f^2$ of beaters C are on one side of said shaft, and legs $g^2$ of beaters C' are on the opposite side thereof, and at their lower ends said legs are each connected with a pivoted link, $f^3$ $g^3$, so that as the crank-shaft revolves, the two series of beaters will be operated substantially as if two crank-shafts were employed, as in the machine first described. With this machine the auxiliary beaters may also be employed.

In Fig. 7 I show another arrangement of the two series of beaters, affording a fulling-bed of a somewhat different character. In this machine two crank-shafts, $B^3$ and $B^4$, are employed, and on the cranks thereof two frames, $o$ and $p$, are mounted, which respectively carry two series of beaters after the manner of the back boards before described. In this mill the fulling-bed has one upwardly-curved end and a straight bottom; but the frames $o$ and $p$ are inclined at an angle of, say, thirty degrees, the curved ends of the beaters being thereby elevated above the opposite or lower end of the bed. A stationary foot-board, $q$, at the lower end of the bed, is mounted on vertical standards rising from the lower portion of the frame of the machine. At each side of the bed of this machine are pendent auxiliary beaters, one of which is shown at $D^2$, which are mounted and operated substantially as those before described. The inclination of the straight portion of the main beaters should not be sufficient to permit the hat-bodies to slip or roll down while supported thereon. The arrangement of the beaters of each series at the curved portions thereof is such that their working curved faces, as a whole, afford the same incline or curve in two directions, already described; but instead of relying in this machine upon a variation in the form or dimensions of the curved portions of these beaters, this effect is obtained by having the beaters substantially alike, but mounted on their frames each a little further upward on the incline than the one at its side, commencing with the outer beaters and terminating with those in the center.

In the machines before described the hat-bodies move quite thoroughly in a cylindrical mass; but in this machine they are tumbled in a less regular mass, because of the straight bed. In operation the hat-bodies are beaten from below, carried along up the incline, then beaten by the curved portions of the main beaters, and by them turned and tumbled backward to the foot of the incline, the auxiliary beaters working meantime upon the hat-bodies in contact therewith, whether singly or in mass.

In some cases it is desirable that felting and fulling operations should be conducted while the goods are submerged in heated liquid, which would be impracticable in the machines before described, although in them hot water may be freely applied, and perforated steam-pipes may also be employed below the beds thereof, in order that numerous jets of hot steam may be directed upward between the beaters against the hat-bodies.

In Fig. 8 I show a machine embodying my invention which can be employed with hot-water jets and steam, if desired, like those previously described; or, if desired, the goods therein may be submerged in liquid. In this machine the series of beaters operate as before described. Each series is provided with two vertically-extended arms pivoted to links $r$, and all are connected with a crank-shaft, $B^5$, which in rotating imparts the proper alternating movements to the two series of beaters, and the entire fulling-bed is located within a tank, F, for the reception of liquid, if desired. In the particular construction here shown each series of beaters has two vertical arms, which are cast in one piece. One arm only of each series is shown, the arm $s$ serving for one end of one series, and arm $s'$ for one end of the other series, of beaters. In this instance straight bars of wood $t\ t'$, serving as beaters, are connected at each end to the arms belonging to their series by studs $u$ and $u'$, which project inward from the curved edges of the arms. Circular disks $v$, pivoted centrally and loosely to brackets projecting from the outer beater-arms, serve as ends to the fulling-bed, and as said disks are free to revolve with the goods no undue abrasive contact occurs therewith.

It is obvious that corrugated beaters, as first described, may also be organized to operate within a tank, if desired.

As a rule I prefer either of the forms of machine before described to that shown in Fig. 8.

Although I have shown several organized fulling-machines, all of which embody two series of beaters, it is to be understood that I am aware that more than two series may be profitably employed, and also that one movable series alternating with a series of stationary faces of a similar form and character to those on the beaters may also be relied upon for operating with good results; and, further, referring to the machine shown in Fig. 1, for instance, I am aware that valuable service may be obtained if the cranks on each shaft be placed in line with each other, (instead of at right angles,) so that the beaters of both series would move together as one series, and if so modified said machine would embrace the main feature of my invention, in that it would embody a vibrating fulling-bed, which, by its vibrations, would beat the contents of the bed and cause them to properly roll and tumble, as is requisite in the operation of fulling or felting.

Having thus described my invention, I claim as new and desire to secure by Letters Patent—

1. The combination, substantially as hereinbefore described, of a fulling-machine bed and mechanism for rapidly vibrating the same with an upward-beating action against the contents of the bed, as set forth, whereby the articles to be fulled or felted are beaten by the bed and caused to turn or tumble therein.

2. A fulling-machine having a fulling-bed composed of vibrating beaters, substantially as described.

3. In a fulling-machine, the combination of one or more series of vibrating beaters, which beat upwardly and inwardly and constitute a fulling-bed, substantially as described.

4. The combination, substantially as hereinbefore set forth, of a vibrating fulling-bed operating as a beater upon its contents, and vibrating auxiliary beaters at the ends of said bed operating in harmony with its vibratory movements.

5. In a fulling-machine, the combination, substantially as hereinbefore described, of vibrating beaters, which constitute the fulling-bed, and the auxiliary beaters.

6. The combination of two series of alternating beaters constituting a fulling-bed, with driving mechanism for alternately vibrating said beaters, substantially as described, whereby each set of beaters will alternately operate in beating against the contents of the bed and in supporting and tumbling or turning said contents, as set forth.

7. The combination of one or more series of vibrating beaters serving as a fulling-bed, with one or more crank-shafts for supporting and vibrating the beaters, substantially as described.

8. The combination of one or more series of vibrating beaters constituting a fulling-bed, auxiliary beaters co-operating therewith, and one or more crank-shafts for operating said beaters, substantially as described.

9. A fulling-bed rapidly vibrated upwardly and inwardly for beating against its contents, and provided with upwardly-curved sides for tumbling the contents of the bed, substantially as described.

10. A vibrating fulling-bed deeper in the center than at either end, substantially as described, whereby during the vibrations of the bed the contents thereof are separated.

11. A vibrating fulling-bed deeper at its center than at either end, and having upwardly-curved sides, substantially as described.

12. The combination, with a fulling-bed through which water may freely pass, of a sprinkling-pipe, substantially as described, whereby hot water may be thrown in jets upon the contents of the bed.

RUDOLF EICKEMEYER.

Witnesses:
HENRY OSTERHELD,
GEORGE NARR.